No. 647,170. Patented Apr. 10, 1900.
C. WAECHTER, Jr.
TIRE FASTENER FOR VEHICLE WHEELS.
(Application filed Feb. 19, 1900.)
(No Model.) 2 Sheets—Sheet 1.

showing Steel Wire, with Connecting Tie.

showing Steel Wire without Connecting Tie.

Cross Section of Connecting Tie - dotted lines indicate Steel Wire.

Witnesses
Ralph S. Warfield
Sarah V. Lockwood

Inventor,
Conrad Waechter Jr.
by Vernon E. Hodges,
his Attorney.

No. 647,170. Patented Apr. 10, 1900.
C. WAECHTER, Jr.
TIRE FASTENER FOR VEHICLE WHEELS.
(Application filed Feb. 19, 1900.)
(No Model.) 2 Sheets—Sheet 2.
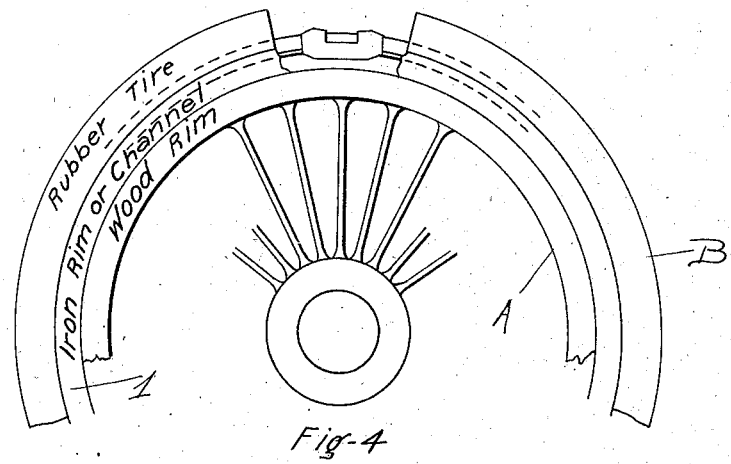
Fig-4
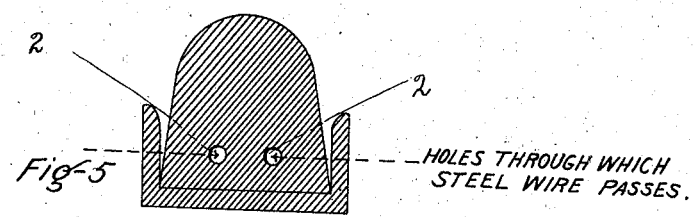
Cross section of Rubber Tire and Iron channel.
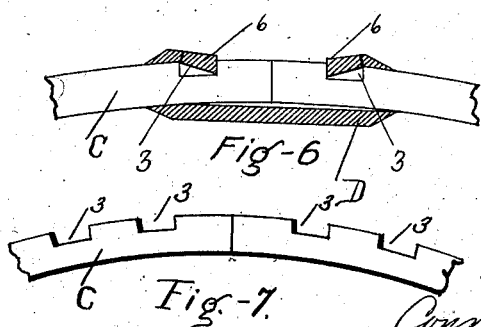
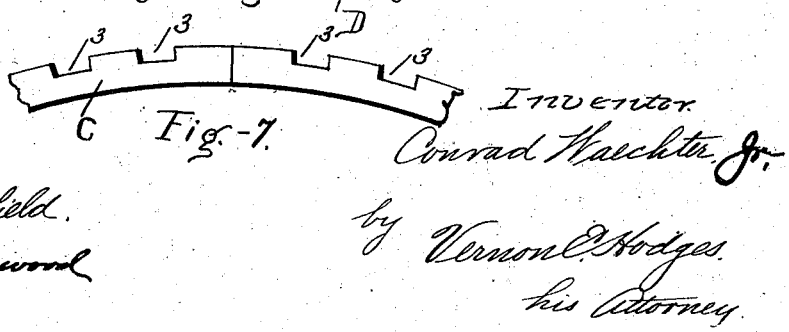

UNITED STATES PATENT OFFICE.

CONRAD WAECHTER, JR., OF MOUNT VERNON, NEW YORK.

TIRE-FASTENER FOR VEHICLE-WHEELS.

SPECIFICATION forming part of Letters Patent No. 647,170, dated April 10, 1900.

Application filed February 19, 1900. Serial No. 5,838. (No model.)

*To all whom it may concern:*

Be it known that I, CONRAD WAECHTER, Jr., a citizen of the United States of America, residing at Mount Vernon, in the county of Westchester and State of New York, have invented certain new and useful Improvements in Tire-Fasteners for Vehicle-Wheels, of which the following is a specification.

My invention relates to an improvement in tire-fasteners for vehicle-wheels. There are at present several methods of wiring cushion and pneumatic tires of vehicle-wheels. For instance, one consists in butting the wire ends together and welding them electrically. Another method employs a spiral wire or wires with ends brazed together before applying the tire to the wheel. In others the ends of the wires are drawn together and brazed with brass spelter or any fusible metal.

My present invention consists of a connecting tie or thimble, preferably composed of steel, in connection with a wire or wires, and also preferably of steel, the ends of which are notched and inserted in said connecting-tie, in which position they are secured by upsetting a portion of the metal of the connecting tie or thimble and forcing it into the notched or recessed ends of the wire or wires, thus rigidly securing the latter together with sufficient strength. This of itself is sufficiently strongly coupled to withstand the strain on the wires and to overcome any possible objection of weakness. Particular attention is called to the fact that the ends may also be brazed, thereby greatly increasing the strength of the joint.

My invention still further consists in certain features of construction and combination of parts, which will be hereinafter described, and pointed out in the claims.

Figure 1:
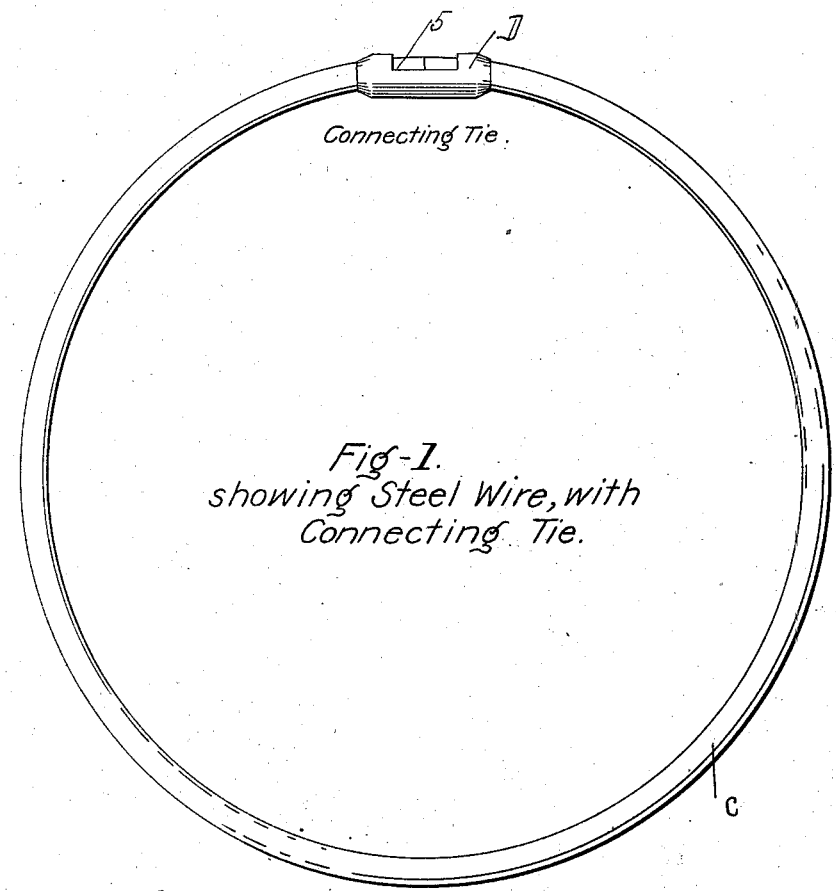
Figure 2:
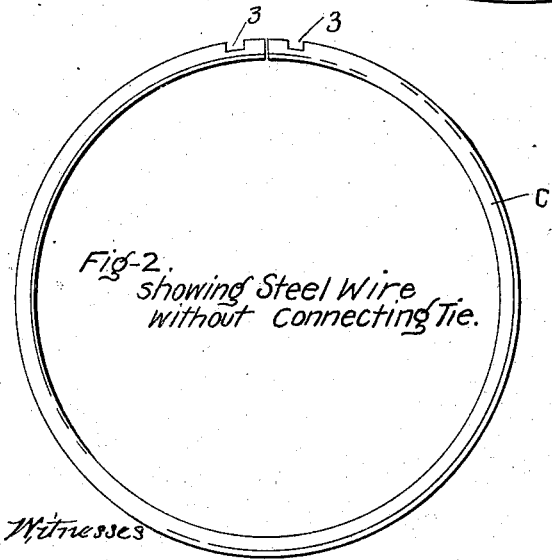
Figure 3:
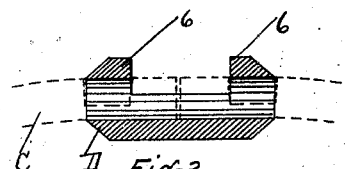

In the accompanying drawings, Figure 1 is a view of my improved connecting-tie in position on wire. Fig. 2 is a view of the wire without the connecting-tie. Fig. 3 is an enlarged sectional view of the tie or thimble. Fig. 4 is a fragmentary view of a wheel, showing the wooden rim, channel-iron, rubber tire, and tire-fastening, a portion of the rubber tire being broken away to show connecting-tie. Fig. 5 is an enlarged sectional view of the rubber tire and channel-iron rim, showing the hole or holes therein through which the wires pass. Fig. 6 is a view showing the wire ends in elevation and the connecting-tie in section, and Fig. 7 is a modification.

A represents the usual wooden rim, and 1 the channel-iron rim.

B denotes the rubber tire, which, as shown, is solid, but which of course might be pneumatic, and which, as shown, has two holes 2 2 to receive the securing-wires. Obviously one hole might be employed or more than two, as the case may be.

C indicates the wire, which passes through the hole 2 for fastening the rubber tire in place in the channel-iron. At or near the ends of the wire notches 3 3 are formed. There might be two or even more notches in each end of the wire, as indicated in the modified construction illustrated in Fig. 7.

D is a connecting tie or thimble. It has a cylindrical bore of a size to receive the ends of the wire, and it is cut away through the center, as at 5, leaving the ends 6 6 intact. These ends 6 6, left by cutting out the center portion of the connecting-tie, are adapted to be forced down into the notches or recesses formed in the ends of the wire, in that way effecting a secure joint for holding the ends of the wire rigidly together. As an additional safeguard these ends might also be brazed, thereby greatly increasing the strength of the joint.

The length of the connecting tie or thimble may of course vary, as best suited to a good strong joint. In applying the rubber tire the rubber is usually made in long strips and cut the desired length and the wire or wires passed through and drawn together and brazed or otherwise secured.

I desire to make it clear that other forms of connecting ties or thimbles might be employed besides those described, the main object being to provide a construction in which a smart blow of a hammer will effect the coupling and make it perfectly rigid and secure by upsetting the connecting tie or thimble and force it into the notches or recesses.

A device of this character is easily and quickly applied and is most effectual in securing the parts together. At the same time it can be introduced at a comparatively-small initial cost.

It is evident that slight changes might be made in addition to those mentioned without departing from the spirit and scope of my invention, and hence I do not wish to limit myself to the exact construction herein set forth; but, Having fully described my invention, what I claim as new, and desire to secure by Letters Patent, is—

1. The combination with a wire notched at the end, of a connecting tie or thimble into the bore of which the said end of the wire is inserted, a portion of the connecting tie or thimble separated from the main portion thereof and adapted to be upset to enter the notch of the wire whereby to form a rigid joint.

2. A fastening device for vehicle-tires comprising a notched wire and a connecting tie or thimble into the bore of which the ends of the wire are inserted, a portion of said connecting tie or thimble being upset to enter said notches whereby to form a rigid joint.

3. A fastener for vehicle-tires comprising a wire having notched ends, of a connecting tie or thimble into the bore of which the notched ends of the wire are inserted from opposite directions, said connecting tie or thimble cut away through the center, leaving the ends intact, said ends adapted to be upset or forced into the notches in the ends of the wires.

In testimony whereof I have signed my name to this specification in the presence of two subscribing witnesses.

CONRAD WAECHTER, Jr.

Witnesses:
GEO. W. KELLY,
ROBERT B. CAMPBELL.